(No Model.)  2 Sheets—Sheet 1.
A. NISBET.
FOOT BALL.
No. 547,281. Patented Oct. 1, 1895.
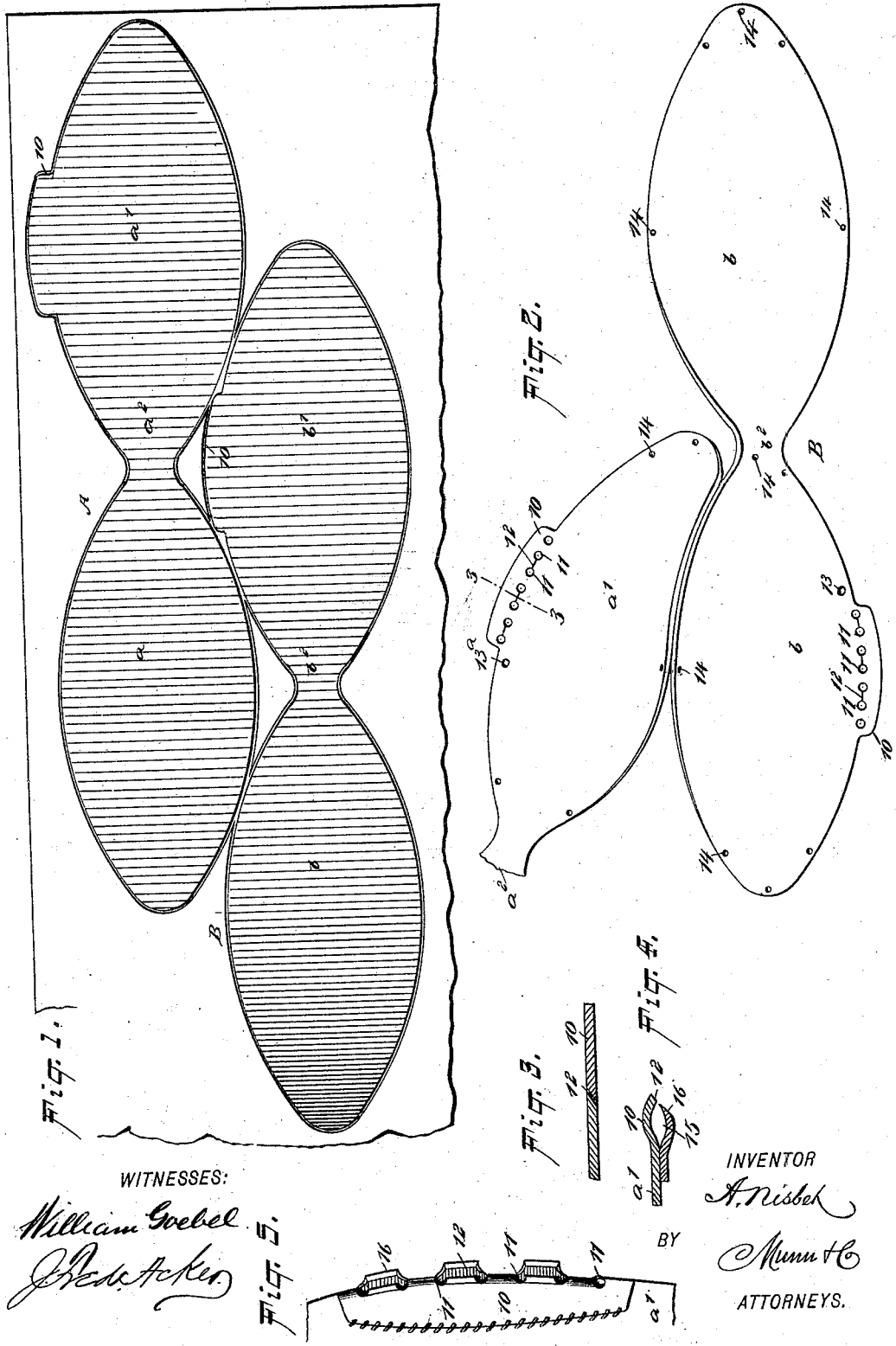
WITNESSES:
William Goebel
Fred Acker
INVENTOR
A. Nisbet
BY
Munn & Co
ATTORNEYS.

(No Model.) 2 Sheets—Sheet 2.

A. NISBET.
FOOT BALL.

No. 547,281. Patented Oct. 1, 1895.

WITNESSES:
William Goebel
J. Fred Acker

INVENTOR
A. Nisbet
BY
Munn & Co
ATTORNEYS.

UNITED STATES PATENT OFFICE.

ALEXANDER NISBET, OF NEW YORK, N. Y.

FOOT-BALL.

SPECIFICATION forming part of Letters Patent No. 547,281, dated October 1, 1895.

Application filed April 5, 1895. Serial No. 544,616. (No model.)

*To all whom it may concern:*

Be it known that I, ALEXANDER NISBET, a subject of the Queen of Great Britain, residing at New York city, in the county and State of New York, have invented a new and useful Improvement in Foot-Balls, of which the following is a full, clear, and exact description.

My invention relates to an improvement in foot-balls, and especially to foot-balls of oval or egg shape; and it has for its object to provide such a ball with a concealed lace, whereby the ball will not fracture the skin of the player, and will also rebound truly when striking on its laced portion.

Another object of this invention is to construct the leather cover of the ball practically in two pieces only, whereby the four connected seams ordinarily employed at the ends of the ball are dispensed with and the said ends rendered as smooth as the sides.

Another object of the invention is to provide a valve for the ball for the purpose of inflating the same, the valve being of such character and so placed that it will not necessitate unlacing the ball to inflate the same.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 6:
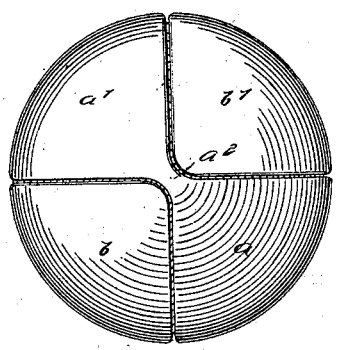
Figure 7:
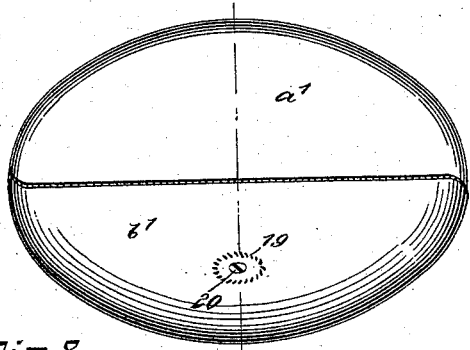
Figure 8:
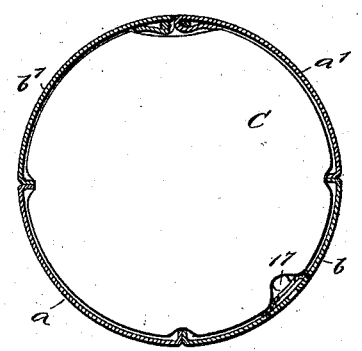
Figure 12:
Figure 9:
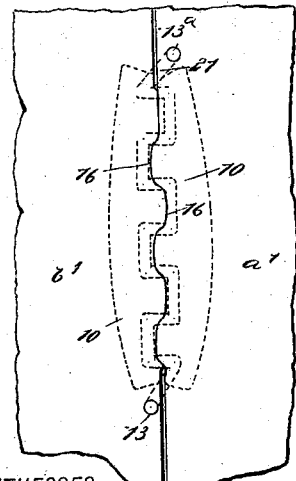
Figure 10:
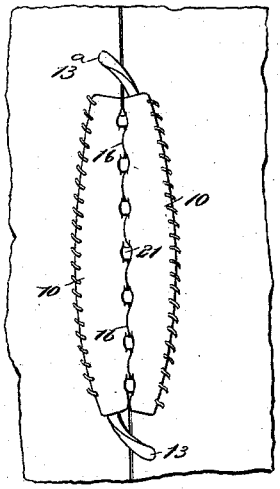
Figure 11:
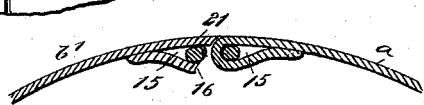

Figure 1 is a plan view of the cover-sections cut from a suitable piece of material. Fig. 2 is a perspective view of one of the said cover-sections and a portion of the second, illustrating the manner in which they are put together. Fig. 3 is a transverse section through the lip of one of the cover-sections, the said view being taken on the line 3 3 of Fig. 2. Fig. 4 is a similar view showing the lip bent over on the body of the section to form a pocket, and Fig. 5 is an inner face view of the lip when bent over as shown in Fig. 4. Fig. 6 is an end view of the ball. Fig. 7 is a side view thereof. Fig. 8 is a section taken through the center of the ball, practically on the line 8 8 of Fig. 7. Fig. 9 is a plan view of the laced portion of the ball, showing the manner in which the concealed lacing is effected. Fig. 10 is an inner face view of that portion of the ball shown in Fig. 9. Fig. 11 is a diametrical section through the laced portion of the ball, and Fig. 12 is a detail view of the valve of the ball.

In carrying out the invention the ball-cover is made up of two main sections A and B, as shown in Fig. 1, the main section A comprising two oval sub-sections or leaves $a$ and $a'$, connected at one of their ends by a narrow integral strip $a^2$. The section B of the ball-cover is similar to the section A, comprising two sub-sections $b$ and $b'$ and a connecting-strip $b^2$. Corresponding sub-sections of the main sections of the cover are each provided at corresponding edges with a lip 10, and this lip is provided, preferably at or near the point where it joins the said line of the sub-section, with any desired number of apertures 11, and the apertures are connected in pairs by means of slots 12, the said slots being beveled, as illustrated in Fig. 3, and the various sub-sections at their margins are provided with guide-apertures 14, correspondingly located to assist in sewing, since the cover is to be stitched together at its sides by a machine and at its end preferably by hand, and the needle may be introduced into any two aligning apertures 14. Furthermore, as the sewing progresses, if the apertures of the various sections come in proper alignment, the operator will be assured that the sections of the cover are being smoothly and uniformly connected. The lip of each sub-section $a'$ and $b'$ of the cover is bent under the said section, as shown in Fig. 5, and is stitched thereto, forming a pocket 15 open at its ends, and consequently, owing to the slots 12, the said pocket will be provided with a number of beveled projections 16 upon its outer face, and the slots in opposing lips are so made that the projections of one lip will enter the spaces between the projections of the other lip, and, as shown in Fig. 9, form a close seam concealing the lacing, and owing to the bevel on the outer faces of these projections the said outer surfaces will fit neatly to the cylindrical surface opposed to them. A cross-section of one of the pockets is clearly shown in Fig. 4.

The bladder or inflatable inner ball C is adapted to be inflated other than in the usual manner and through the medium of a valve 17, which valve may be of any construction available for the purpose, and the valve is located in the side of the outer skin or cover, ordinarily almost opposite the lacing thereof, as shown best in Fig. 8, and the valve is secured to the inner face of the outer or main cover by means of a leather keeper 18, preferably of disk form and which is stitched to the cover, the line of stitching 19 appearing at the outside of the ball, as shown in Fig. 7. Normally the valve is closed by means of a screw 20, or its equivalent, and when this screw is removed the air-pump may be readily introduced and the entire ball inflated. The lacing 21 is passed through an opening 13 in the cover, adjacent to one of the lips, and is then carried across the longitudinal opening in the cover to be closed, passing from one pocket to the other through the openings or apertures 11, as shown in Fig. 9, and the opposite end of the lace is then carried outward through an opening 13$^a$ in a section of the cover opposed to the opening 13 and at the opposite end of the slot to be closed by the lacing, as is illustrated in both Figs. 9 and 10.

A ball constructed as above set forth possesses many advantages over the ordinary oval or egg ball, since, as heretofore stated, its ends are perfectly smooth and the usual bunching of seams at such points is dispensed with. It is obvious that the ball may be inflated without disturbing the lacing, and that the ordinary lacing may be used, as well as the improved form of lacing. It is further obvious that when the interior or inflatable cover C becomes worn it may be readily substituted by another.

Having thus described my invention, I claim as new and desire to secure by Letters Patent—

1. In a foot ball, a cover, the same consisting of two main sections, each comprising two elliptical sub-sections, a narrow connecting strip and a lip projecting from the side margin of corresponding sub-sections, the said lips being provided with apertures, and slots connecting pairs of apertures, the said lips of the sub-sections being adapted for engagement with the under faces of said sections, substantially as and for the purpose specified.

2. A cover for foot balls, in which opposing sections of the cover are each provided with a pocket at abutting edges, the pockets being formed upon the inner faces of the sections, each pocket having elongated openings and projections from the side walls thereof, the projections having their inner side edges downwardly and inwardly beveled, the projections from one pocket being adapted to enter the space between the projections of the opposing pocket, as and for the purpose specified.

3. In the construction of foot balls, the combination, with the leather cover and the interior inflatable cover, of a valve attached to the outer cover and connected with the inner one, and means for normally closing the outer end of the valve and maintaining it substantially flush with the outer face of the ball, as and for the purpose specified.

4. In a foot ball, a cover, the same consisting of two main sections each comprising two elliptical sub-sections, a narrow connecting strip, and a lip projecting from the side margin of corresponding sub-sections and adapted for engagement with the under faces of said sections, the said lips being provided with apertures and also provided with slots connecting pairs of apertures, the said sections being provided with openings adjacent to the said lips and through which the lacing is passed, as and for the purpose specified.

5. In the construction of foot balls, a cover, the same consisting of two main sections each provided with corresponding guide apertures adapted to register with each other when the sections of the cover are to be united, each main section comprising two elliptical sub-sections, a narrow connecting strip, and a lip projecting from the side margin of corresponding sub-sections and adapted for engagement with the under faces of the said sections, the said lips being provided with a series of apertures and the said apertures being connected in pairs by means of slots, as and for the purpose specified.

ALEXANDER NISBET.

Witnesses:
J. FRED ACKER,
JNO. M. RITTER.